INVENTOR
RICHARD THOMAS MC BRIDE
BY Claude L. Beaudoin
ATTORNEY

| United States Patent Office | 3,507,763 |
|---|---|
| | Patented Apr. 21, 1970 |

3,507,763
METHOD FOR ELECTRICAL DISCHARGE TREATMENT OF ORGANIC POLYMERIC MATERIALS
Richard Thomas McBride, Buffalo, N.Y., assignor to E. I. du Pont de Nemours and Company, Wilmington, Del., a corporation of Delaware
Filed Dec. 22, 1967, Ser. No. 692,839
Int. Cl. B44d 1/092
U.S. Cl. 204—169      6 Claims

ABSTRACT OF THE DISCLOSURE

Polymeric film structures are subjected to electrical discharge treatment in a reactive gaseous atmosphere by advancing the polymeric material through the treating zone between spaced electrodes wherein the film first contacts the surface of the grounded electrode followed by reversing the path of travel of the polymeric film whereby the surface contacts the other electrode thereby to provide a protective envelope affording a protective covering for the electrodes

---

The present invention relates to the surface treatment of organic polymeric materials and, more particularly, is directed to a process and apparatus for the electrical discharge treatment of shaped structures of organic thermoplastic polymeric material.

The electrical discharge treatment of organic thermoplastic polymeric structures such as, for example, subjecting the surface of polyethylene film to the action of an electrical discharge, is a now well-known method for activating the surfaces thereof as for rendering the surfaces of such structures adherable to a wide variety of materials as, for example, printing inks, adhesives and coating compositions. In practice, such treatment may be performed by passing a sheet or film of organic thermoplastic polymeric material at a suitable rate such as between about 10 and 300 feet per minute over and in contact with a grounded metal drum while the surface of the sheet or film away from the drum passes under and in close proximity to an electrode that is connected to a source of high frequency alternating potential and which is spaced, for example, between about 0.010 and 0.025 inch, from the film surface.

It also is known to conduct the above-described electrical discharge treatment while directing a gas or vapor into the spacing or treating zone between the charged treating electrode and the surface of the polymeric film to be treated. During the latter treatment, the gas or vapor may be discharged into the treating zone from either a discharge orifice in a hollow treating electrode which also functions as a conduit for the gas or from a separate tube such as a sparger. For example, each of U.S. Patents Nos. 3,255,099 and 3,274,089 discloses a method and suitable apparatus for subjecting polymeric films to electrical discharge treatment at substantially atmospheric pressure between spaced electrodes wherein a gaseous vapor of an organic or inorganic agent is directed into the space between said electrodes and the polymeric material being treated. One major drawback of the last mentioned electrical discharge treating method and apparatus resides in the accumulation of reaction products from the gaseous reactive atmosphere which form during the electrical discharge treatment and deposit on the exposed portions of the electrodes, as well as on other parts of the apparatus. The deposition of such material on the electrodes is undesirable and causes difficulty in that the clearances or gap distances between the electrodes and the material being treated is altered and treatment as, for example, throughout the width and length of sheet material being treated is not uniform. Furthermore, at least with some gaseous reactive materials the amount of deposit on the heating electrodes becomes so great that extended operation cannot be realized. Accordingly, it is the principal object of the present invention to provide an improved method and apparatus for the electrical discharge treatment of plastic structures in gaseous reactive atmospheres which substantially avoid the above-mentioned difficulties.

According to the present invention there is provided a method for treating the surface or organic polymeric materials which comprises (1) advancing said organic polymeric material through the electrical discharge treating zone between spaced-apart electrodes comprising a grounded electrode and at least one electrode connected to a power source; (2) directing a gaseous atmosphere into said treating zone; and (3) reversing the travel of said polymeric material after its passage through the electrical discharge treating zone and again advancing said organic polymeric material through said electrical discharge treating zone between said spaced-apart electrodes.

According to the present invention there is further provided an apparatus for the electrical discharge treatment of organic polymeric materials in a reactive gaseous atmosphere for improving the surface adherability characteristics thereof which comprises (1) a rotatably mounted and electrically grounded roll adapted to support said organic polymeric material; (2) at least one rotatably mounted electrode adapted for connection to an electrical power source and disposed adjacent said grounded roll thereby to provide a gap spacing therebetween; (3) means for advancing said organic polymeric material through said gap spacing; (4) means for reversing the travel of said organic polymeric material and again advancing said organic polymeric material through said gap spacing, and (5) means for introducing a gaseous atmosphere directly into said gap spacing.

The nature and advantages of the invention will be more clearly understood by the following description and the several views illustrated in the accompanying drawings wherein like reference characters refer to the same parts throughout the several views and in which.

Figure 1:
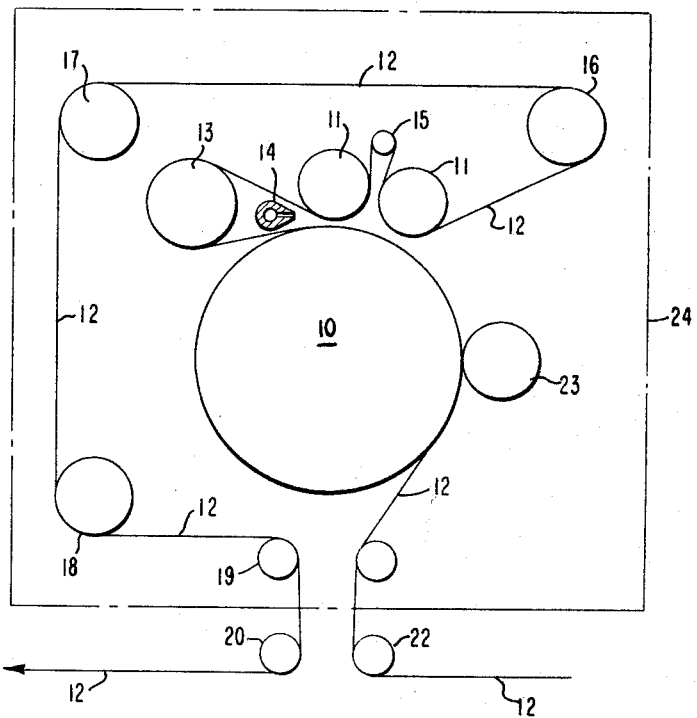
FIGURE 1 is a schematic cross-sectional view of a side elevation of the salient operative elements of the apparatus of the invention.

The electrical discharge treating apparatus herein disclosed in illustration of the invention includes spaced electrodes consisting of a rotatably mounted roll, drum or cylinder 10 of electrically conductive material that is electrically grounded and at least one electrode 11 disposed adjacent thereto and spaced from the surface thereof a suitable distance permitting the passage therebetween of a film structure 12. Roll 10 is preferably driven by suitable means such as a motor operatively connected thereto, and may be conveniently provided with suitable inlet and outlet ports for circulating a fluid medium therethrough for regulating the temperature of its surface. The grounded roll 10 or electrode 11 has a dielectric covering such as, for example, a film covering of polyethylene terephthalate or other plastic film having high dielectric properties, and coatings of ceramic materials. A suitable spacing of electrode 11 from the surface of film 12 is one ranging between about .015 inch and .25 inch. Each electrode 11 is constructed of electrically conducting material, preferably metal such as brass, copper, aluminum or alloy compositions thereof, and is connected electrically to a suitable power source (not shown)

adapted to supply either an alternating current or a pulsating direct current of the required magnitude at the required voltage and frequency. Each electrode 11 may be driven by suitable means such as a motor and may be provided with inlet and outlet ports for circulating a fluid medium therethrough for regulating the temperature thereof.

Figure 2:
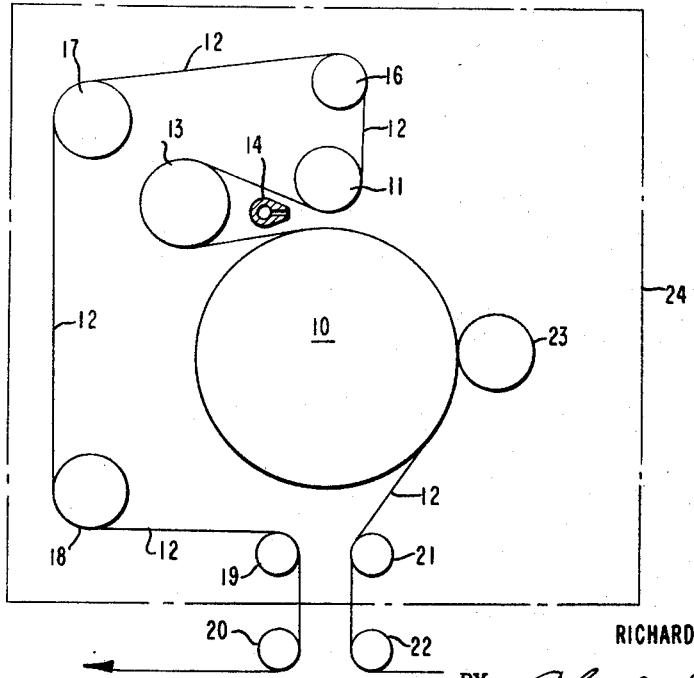
FIGURE 2 is another schematic cross-sectional view of a side elevation of the salient operative elements of another embodiment of the apparatus of the invention.

The apparatus further includes an idler roll 13 adapted to reverse the path of travel of film 12 by directing it in a clockwise direction therearound. An adjustable vapor knife 14 comprising a hollow tube having a slot-type orifice discharge passage is provided for directing a suitable reactive gaseous atmosphere directly into the gap spacing or treating zone between the electrode elements 10 and 11. The slot orifice is adjusted to a narrow opening at the feed end with gradually wider opening toward the opposite end so as to provide a uniform flow of gaseous atmosphere across the width of the film. In general, the gaseous atmosphere comprises a reactive agent in a suitable carrier gas such as nitrogen. If more than one electrode element 11 is employed, then the polymeric film structure 12 is preferably advanced clockwise around idler roll 15 located between successive electrodes 11. Rolls 16, 17 and 18, shown in FIGURE 1, are transfer rolls at least some of which are preferably driven to advance film 12 in the apparatus. The rolls 19–22 are idler rolls for directing the film into the treating apparatus and from the apparatus to a suitable wind-up station after treatment. The embodiment shown in FIGURE 2 illustrates the apparatus when a single electrode 11 is employed with the grounded roll 10. Optionally, a press roll or ironer roll 23 may be employed to press the film firmly onto the grounded roll and to assure that no gaseous atmosphere is trapped beneath the film as it traverses the grounded roll which would give rise to reverse side treatment, which in most cases is not desired. A suitable enclosure 24 surrounds the apparatus so as to maintain the desired atmosphere within the apparatus and to prevent noxious gases and fumes from permeating into the surrounding atmosphere.

In operation, the continuous polymeric film structure 12 is advanced over idler rolls 21 and 22 and onto electrically grounded roll 10 and the surface of film 12 away from roll 10 passes under electrode 11 and through the treating zone therebetween wherein the electrical discharge treatment takes place. The film structure 12 next advances to roll 13 and travels clockwise therearound whereby the path of the film is reversed and the film is drawn over the surface of each of electrode rolls 11, and thereafter the film 12 is continuously advanced over transfer rolls 16, 17 and 18 and over idler rolls 19 and finally to the wind-up station (not shown). It is readily seen that the gaseous atmosphere is discharged directly into the gap or treating zone between electrodes 10 and 11 and that it also is contained in an enclosing envelope of the film under treatment as the latter traverses to and from idler roll 13. Thus high concentrations of the gaseous reactant are kept substantially out of contact with the main portions of the roll electrodes thereby preventing build-up of deposits on the rolls during the electrical discharge treatment. In this way a constant gap between the opposing electrodes can be maintained and uniform treatment of the continuous film structure can be realized. By maintaining the length of the electrodes substantially the same as that of the width of the film being treated there is substantially no tendency for the gaseous reactive atmosphere to deposit on the rotating surface of the electrodes.

In typical illustrations of the operation of the apparatus, a film of a copolymer of tetrafluoroethylene and hexafluoropropene is treated in an electrical discharge in an atmosphere of glycidyl methacrylate in a carrier gas of nitrogen. Sustained production runs are realized without the necessity for shutting down the equipment to remove deposits from the electrode surfaces. By contrast, in carrying out the same treatment in an apparatus which does not have the confining film envelope and the rotating electrodes of this apparatus, the operation has to be closed down frequently to remove deposits from the rotating electrodes.

In another illustration, the benefits derived from the apparatus and method are illustrated in the treatment of a film of biaxially oriented and heat-set polypropylene in an atmosphere of chlorine (in a carrier gas of nitrogen) in an electrical discharge. In a conventional apparatus, the chlorine atmosphere being highly corrosive, shows damage to the electrode surfaces in a relatively short period of operation. With the confining envelope of plastic film which is afforded in the improved apparatus of the present invention, there is a greatly decreased tendency for the electrode surfaces to be attacked by the rigorous atmosphere of chlorine in the electrical discharge.

In the preferred embodiment of this apparatus and method the ground roll is driven and it is covered with a dielectric such as a coating of Hypalon (chlorosulfonated polyethylene synthetic rubber—Du Pont Co.). It is preferred to use with this apparatus at least 2 opposing electrodes connected to the power source with the electrodes covered with a layer of biaxially oriented polyethylene terephthalate film.

In carrying out the surface treatment of polymeric structures according to the present invention the power source for the electrical discharge between the electrodes may be a motor generator, a spark gap oscillator or similar device. For a spark gap oscillator the current supplied to the electrode structure may be up to about 5.5 RMS (root mean square) amperes, and for optimum satisfactory results the current is preferably between about 0.3 and about 3.5 amperes (RMS). Frequencies from 350 cycles per second up to 500,000 cycles per second and above can be used.

The potential difference maintained between the electrodes may vary from low voltages in the order of about 1000 volts up to peak pulsating voltages of about 100,000 volts and higher. In general, the voltage level is maintained between 2000 and about 8000 volts.

The power supplied to the electrodes may, under the operating parameters above specified, preferably range between about 5 and about 50 watts per lineal inch of electrode length, based upon treating electrode 11. Treating intensity imposed on the film is in the range of 0.2 to 20 watt-minutes per square foot of film and preferably in the range of 0.5 to 1.5 watt-minutes per square foot of film.

The space between the surface of a polymeric film structure passing through treating zone and the face of electrode 11 may range between about 0.015 inch and 0.25 inch. When treating polypropylene film, the space between the polymeric film and electrode 11 is preferably between about 0.025 inch and about 0.060 inch. Of course, selection of the proper space depends upon a number of variables such as the nature of the polymeric material, the power supplied to the electrodes, the dimension of the treating electrode, and the time of exposure of the polymeric film to the action of the electrical discharge.

The time of exposure of the polymeric material to the electrical discharge treatment is only that which is necessary for obtaining satisfactory treatment, and may vary from as low as one second or even less to as long as one minute and even more. The major consideration regarding the selection of exposure time is economic, consistent with obtaining satisfactory treatment of the polymeric material.

The primary advantage of the present invention is that it provides a treating method which can be operated on a continuous basis for commercial production and, moreover, it provides a very uniform treatment in that the gap distance between the electrodes can be very carefully controlled and maintained. An added advantage with the adjustable vapor knife arrangement is greater treating uniformity across the width of the film. Furthermore, a greater treating efficiency is realized when the film travels through the treating zone more than once.

What is claimed is:

1. In a method of treating polymeric film with a reactive gas in an electric discharge including moving said film through a zone defined by spaced electrodes comprising at least a grounded electrode and at least one electrode connected to a power source while an electric discharge is supported in said zone by a potential across said electrode and while simultaneously introducing said reactive gas into said zone; the improvement wherein said film is moved contiguously over the grounded electrode through said zone followed by reversing the path of travel of said film to move contiguously over the other electrode so as to shield said electrodes from the discharge.

2. The method of claim 1 wherein the electrodes are spaced to provide a distance between the surface of said polymeric film as it passes through the discharge zone before the direction of the film is reversed and the electrode connected to the power source of between about 0.015 inch and about 0.25 inch, wherein said electrical discharge has an average energy level below about 15 electron volts, and wherein said film is exposed to said discharge between about one second and about one minute.

3. The method of claim 1 wherein said organic polymeric material is a self-supporting film structure of a copolymer of tetrafluoroethylene and hexafluoropropene.

4. The method of claim 3 wherein said gaseous atmosphere is glycidyl methacrylate in a carrier gas of nitrogen.

5. The method of claim 1 wherein said organic polymeric material is an oriented self-supporting film structure of polypropylene.

6. The method of claim 5 wherein said gaseous atmosphere is chlorine in a carrier gas of nitrogen.

References Cited

UNITED STATES PATENTS

| | | | |
|---|---|---|---|
| 3,068,510 | 12/1962 | Coleman | 204—168 |
| 3,274,091 | 9/1966 | Amorski | 204—165 |
| 3,275,540 | 9/1966 | McBride | 204—165 |
| 3,397,132 | 8/1968 | Wolinski | 204—165 |

ROBERT K. MIHALEK, Primary Examiner

U.S. Cl. X.R.

204—312